(12) United States Patent
Rafalowski et al.

(10) Patent No.: US 12,483,769 B2
(45) Date of Patent: Nov. 25, 2025

(54) METHOD OF ASSEMBLING AN OPTICAL DEVICE AND OPTICAL DEVICE ASSEMBLED ACCORDING TO THE SAME

(71) Applicant: APTIV TECHNOLOGIES LIMITED, St. Michael (BB)

(72) Inventors: Arkadiusz Rafalowski, St. Michael (BB); Pawel Hebda, St. Michael (BB)

(73) Assignee: Aptiv Technologies AG, Schaffhausen (CH)

( * ) Notice: Subject to any disclaimer, the term of this patent is extended or adjusted under 35 U.S.C. 154(b) by 167 days.

(21) Appl. No.: 18/204,470

(22) Filed: Jun. 1, 2023

(65) Prior Publication Data

US 2023/0396866 A1 Dec. 7, 2023

(30) Foreign Application Priority Data

Jun. 7, 2022 (EP) ..................... 22177614

(51) Int. Cl.
*H04N 23/54* (2023.01)
*H04N 23/51* (2023.01)
*H04N 23/52* (2023.01)
*H04N 23/55* (2023.01)
*H04N 23/695* (2023.01)

(52) U.S. Cl.
CPC ............. *H04N 23/54* (2023.01); *H04N 23/51* (2023.01); *H04N 23/52* (2023.01); *H04N 23/55* (2023.01); *H04N 23/695* (2023.01)

(58) Field of Classification Search
CPC ........ H04N 23/54; H04N 23/51; H04N 23/52; H04N 23/55; H04N 23/695; H04N 17/002

See application file for complete search history.

(56) References Cited

U.S. PATENT DOCUMENTS

| | | |
|---|---|---|
| 4,803,557 A | 2/1989 | Bridges |
| 2007/0252910 A1* | 11/2007 | Gottwald ............... H04N 23/50 348/E5.025 |
| 2021/0122299 A1 | 4/2021 | Garcia |

FOREIGN PATENT DOCUMENTS

EP 1668891 B1 1/2017

OTHER PUBLICATIONS

Extended European Search Report issued by the European Patent Office in connection with International Application No. 22177614.9, dated Dec. 7, 2022.

* cited by examiner

*Primary Examiner* — Yogesh K Aggarwal
(74) *Attorney, Agent, or Firm* — Miller Johnson

(57) ABSTRACT

Method of assembling an optical device including providing a circuit board having an imager mounted thereto, wherein the imager has an active region. A housing is provided having a support for supporting the circuit board and an opening for an optical path to form an image at a known image position relative to the opening. The circuit board is placed on the support and its position is adjusted using one or more manipulators to align the active region with the image position. The circuit board may then be secured in an aligned position.

10 Claims, 3 Drawing Sheets

METHOD OF ASSEMBLING AN OPTICAL DEVICE AND OPTICAL DEVICE ASSEMBLED ACCORDING TO THE SAME

CROSS-REFERENCE TO RELATED APPLICATION

This application claims the benefit of European patent application serial number EP 22177614.9 filed on Jun. 7, 2022. The entire contents of which are hereby incorporated by reference herein.

INTRODUCTION

The present disclosure relates to a method of assembling an optical device. The present disclosure also concerns an optical device assembled using the method. The disclosure is particularly relevant to a method of assembling an automotive camera, and the manufacture of camera assemblies for automotive applications.

BACKGROUND

Cameras and other optical devices are important sensors in automotive applications, particularly with the increasing prevalence of autonomous driving and safety assistance systems. As these systems become more advanced, they have driven the use of higher resolution cameras. However, as a digital camera's resolution increases, it becomes more sensitive to optical misalignment caused by, for example, tolerances during the manufacturing process, as well as strain and deformations arising once the camera's imager is fixed in place.

In this respect, during a conventional camera device assembly process, an imager soldered to a printed circuit board (PCB) will typically be mechanically secured via the PCB to a lens holder or housing, for example using screws. A lens will then be actively aligned to the imager assembly to align its focal plane with the sensitivity plane of the imager's sensor. This allows a focused image output to be provided. Once in its aligned position, the lens is then secured by curing an adhesive at the mounting interface between the lens and the lens holder.

The above assembly process is relatively expensive because of the number of steps that have to be performed. Furthermore, positional inaccuracy can still occur. For example, although the lens active alignment step can be used to correct for tilting of the imager relative to the lens elements, it does not address, for example, potential rotation of the imager relative to the lens holder or housing. Such rotational inaccuracies may arise, for instance, because of the imager's mounting on the PCB itself and/or how the PCB sits once fixed to the lens holder. For example, one or more overtightened screws may shift the PCB, and hence the imager, relative to the lens holder or housing. As such, when the sub-assembly is subsequently installed into a vehicle, the image frame may be slightly rotated. This is becoming an increasingly important issue as modern vehicle sensor systems require camera devices to provide a consistent and accurate image frame. Indeed, many vehicle manufacturers (OEMs) now require the rotational variance in the image frame to be not more than 3%, which presents a significant challenge using conventional methodologies and arrangements.

In view of the above, there is a need for improved optical device manufacturing methods and arrangements.

SUMMARY

According to a first aspect, there is provided a method of assembling an optical device, including: providing a circuit board having an imager mounted thereto, wherein the imager has an active region; providing a housing having a support for supporting the circuit board and an opening for an optical path to form an image at a known image position relative to the opening; placing the circuit board on the support; adjusting the position of the circuit board on the support using one or more manipulators to align the active region with the image position; and securing the circuit board in the aligned position.

In this way, an optical device, such as a camera, may be provided having a greater accuracy in that the image focused onto the imager may be more accurately aligned with the imager's active region. That is, in the resultant assembly, the sensitive part of imager's upper surface used to form image frame data may be positioned to match the position of the image projected by the lens more accurately. As such, the image focused by the lens may be within or substantially coincident with the imager's active region. As this accuracy is provided by a physical adjustment using one or more manipulators to precisely move the circuit board into position within each assembly, manufacturing consistency is also achieved. This thereby, allows for the production of highly accurate optical devices meeting OEM supply requirements.

In embodiments, the step of adjusting the position of the circuit board includes rotating the circuit board on the support to align the active region with the image position. In this way, the orientation of the imager's active region may be accurately aligned to match the orientation of the projected image.

In embodiments, the step of providing the housing includes providing a lens holder part of the housing and a backing part of the housing for connection to the lens holder part. In this way, the housing may be provided as a two-part assembly for allowing the circuit board to be accommodated into its interior.

In embodiments, the method further includes the step of fitting the lens holder part and the backing part together once the circuit board has been placed on the support, and wherein the support is formed in the backing part and the step of adjusting the position of the circuit board housing includes inserting the one or more manipulators through the opening. In this way, the circuit board may be accessed using the opening provided in the housing assembly, thereby allowing the circuit board to be shifted to precisely position it. This may also be actioned while the parts are in a assembled state, but prior to fixing. Consequently, subsequent assembly steps, which may otherwise compromise accuracy may be avoided.

In embodiments, the method further includes the step of fitting the lens holder part and the backing part together once the position of the circuit board has been adjusted, wherein the support is provided on the lens holder part and the step of adjusting the position of the circuit board housing includes engaging the one or more manipulators via an exposed rear region of the lens holder part. In this way, the circuit board may be accessed using the opening provided in the rear of the housing assembly, thereby allowing the circuit board to be conveniently shifted to precisely position it while it is seated within the lens holder.

In embodiments, the step of securing the circuit board in an aligned position includes connecting the lens holder part to the backing part and fixing the connection therebetween.

In this way, the lens holder and backing parts may be fitted together by aligning their mating parts, and then that connection can be fixed to secure the parts together.

In embodiments, the housing further includes one or more clamping formations, wherein the step of securing the circuit board includes the one or more clamping formations clamping the circuit board against the support. In this way, once the circuit board is seated against the support in the aligned position, the clamping action of the clamping formations can be used to fix circuit board in place, without the need for screws, fasteners or adhesives. The clamping formation may be, for example, formations corresponding to the support. Such formations may be provided on the opposing surface within the housing.

In embodiments, the step of providing a housing includes providing the support with an engagement surface for engaging the circuit board, wherein the engagement surface includes at least one of a heatsink surface for conducting heat away from the circuit board and a grounding surface for grounding the circuit board. In this way, the support may be used to thermally stabilise or electrically ground the circuit board. This may thereby improve the operation and reliability of the optical device. In embodiments, a heatsink surface and/or a grounding surface may be provided on one or more corresponding clamping formations.

In embodiments, the method further includes the step of projecting a projected image onto the known image position using a projector and the step of adjusting the position of the circuit board includes aligning the active region with the projected image. In this way, an optical path simulating that which would be generated by the lens when the optical device in use may be used for precise alignment. For example, a projected image may include a positional marker, and feedback from the imager itself may be used to identify when the positional mark is correctly located. An apparatus may be provided with a precisely calibrated locator for locating the housing relative to the projector.

According to a second aspect, there is provided an optical device manufactured according to the above method.

According to a third aspect there is provided a manufacturing apparatus for use during the above method, the apparatus including one or more manipulators and a controller configured to control the one or more manipulators to align the active region with the image position. In this way, an apparatus for assembling and accurately configuring optical devices may be provided.

According to a fourth aspect, there is provided an optical device, including: a circuit board having an imager mounted thereto; a housing including a lens holder part having an opening for an optical path, and a backing part connected to the lens holder part, wherein the circuit board is secured in place by a clamping action between the lens holder part and the backing part.

In this way, an optical device is provided in which the circuit board, such as a Printed Circuit Board (PCB), is clamped in place by the housing assembly itself. This thereby avoids the need to independently fix the circuit board to a part of the housing using a separate fixing means, such as screws, other fasteners, or adhesives. Consequently, surface area on the circuit board is not unnecessarily occupied by the mounting positions used for additional fasteners. At the same time, manufacturing efficiency is improved as a separate fastening step to fix the circuit board is avoided.

In embodiments, one of the lens holder part and the backing part includes a support for supporting the circuit board and the other of the lens holder part and the backing part includes one or more clamping formations, wherein the one or more clamping formations clamp the circuit board against the support. In this way, formations provided within the parts of the housing combine to provide the fixture for the circuit board, thereby avoiding the need for additional mounting methods, such as screws, hot staking riveting or gluing or the like.

In embodiments, at least one of the lens holder part and the backing part includes at least one of a heatsink surface for conducting heat away from the circuit board and a grounding surface for grounding the circuit board. In this way, the assembly may be provided with improved thermal properties and/or electromagnetic compatibility.

According to a fifth aspect, there is provided a method of assembling an optical device, including: providing a circuit board having an imager mounted thereto; providing a lens holder part having an opening for an optical path and a backing part for connection to the lens holder part; and connecting the backing part and the lens holder part together and fixing the connection to secure the circuit board in place by a clamping action between the lens holder part and the backing part. In this way, a method of assembling the above optical device is provided.

BRIEF DESCRIPTION OF DRAWINGS

Illustrative embodiments will now be described with reference to the accompanying drawings in which.

DETAILED DESCRIPTION

Figure 1:
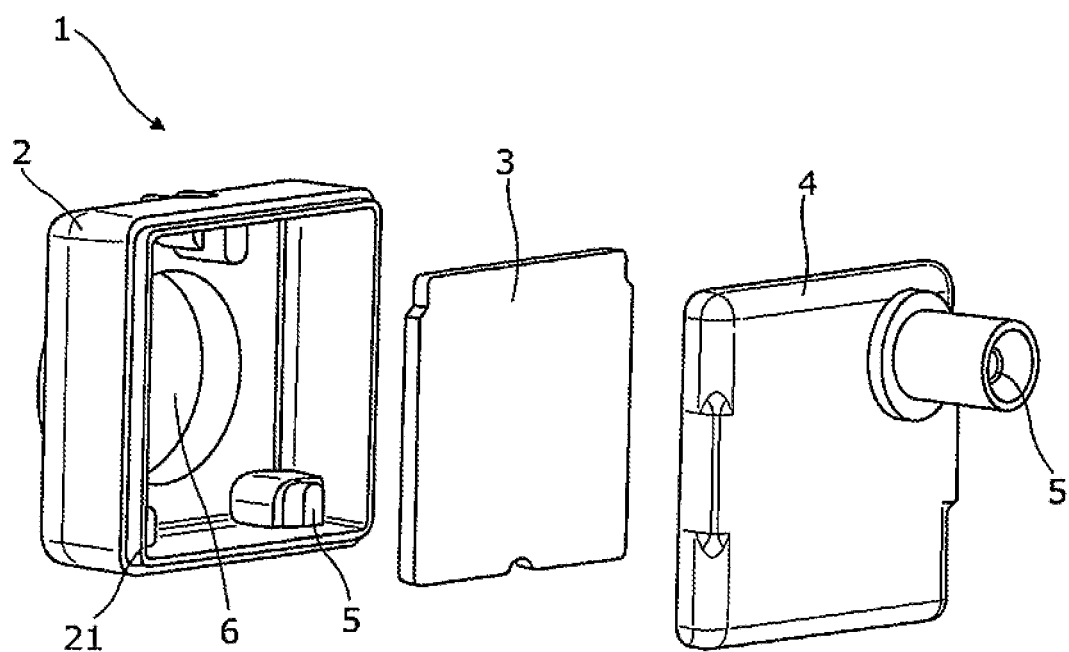
FIG. 1 shows an exploded view of a camera according to an illustrative embodiment.

FIG. 1 shows an exploded view of a camera 1 according to an illustrative embodiment. The camera 1 includes a front housing part 2, a rear housing part 4, and a PCB 3 onto which an imager (not visible in this figure) is soldered.

The front housing part 2 includes an opening 6 which forms a lens holder for supporting a lens at the front of the assembly. The body of the front housing part 2 defines a cavity, the interior of which includes three clamping formations 5 against which the PCB 3 may be engaged against. The clamping formations 5 each include a metal pad which forms a rearward facing engagement surface for engagement against the PCB 3. A flange 21 is provided around the wall of the body for locating the front housing part 2 relative to the rear housing part 4 when fitted together. In this embodiment, the housing is formed as a polymer moulding.

Figure 2:
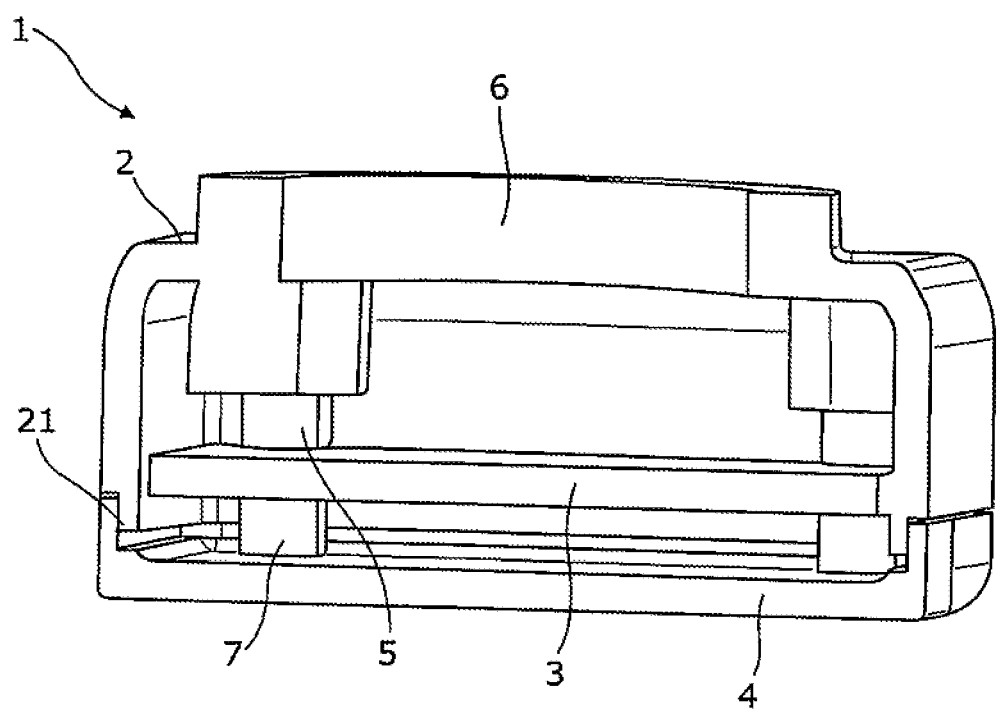
FIG. 2 shows a cross sectional view of part of the camera shown in FIG. 1 once assembled.

The rear housing part 4 forms a cover or backing part for the front of the housing. A cable access port 5 is provided for connecting power and data cabling to the PCB 3. As shown in FIG. 2, the interior of the rear housing part 4 is further provided with clamping formations 7, which correspond to the clamping formations 5 provided on the front housing part 2. As such, the clamping formations 7 are located to oppose the clamping formations 5 and together act to clamp the PCB 1 in place once the parts are assembled. Furthermore, as shown in FIG. 2, once assembled, the flange 21 is located inside the wall of the rear housing part 4, with these opposing surfaces providing mating regions for aligning the housing parts. The opening 6 is provided at the front of the assembly, above the PCB 3 (shown at the top in FIG. 2).

In this embodiment, during assembly of the camera 1, the PCB 3 may be seated onto the clamping formations 7 provided on the rear housing part 4. As such, the clamping formations support the rear surface of the PCB 3. The front housing part 2 is then fitted to the rear housing part 4, which thereby engages the clamping formations 5 with the front surface of the PCB 3. It will be understood that in other embodiments, the PCB 3 may instead be first seated onto the clamping formations 5 provided on the front housing part 2, with the rear housing part 4 then being fitted to it. In this scenario, the clamping formations 5 function as the support. When initially assembled, the front and rear housing parts 2 and 4 are insecurely connected, with the fixture of these two parts being implemented later in the process. As such, at this stage, the PCB 3 is loosely held in place between the clamping formations 5 and 7.

Figure 3:
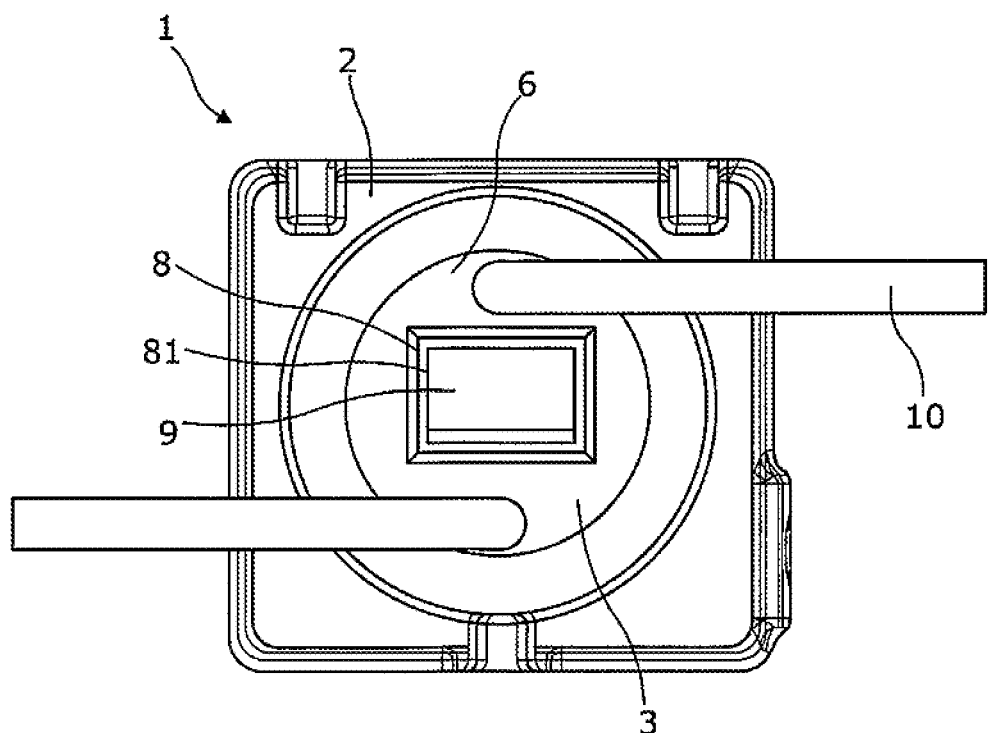
FIG. 3 shows a top view of the camera shown in FIG. 1 during the alignment step.
Figure 4:
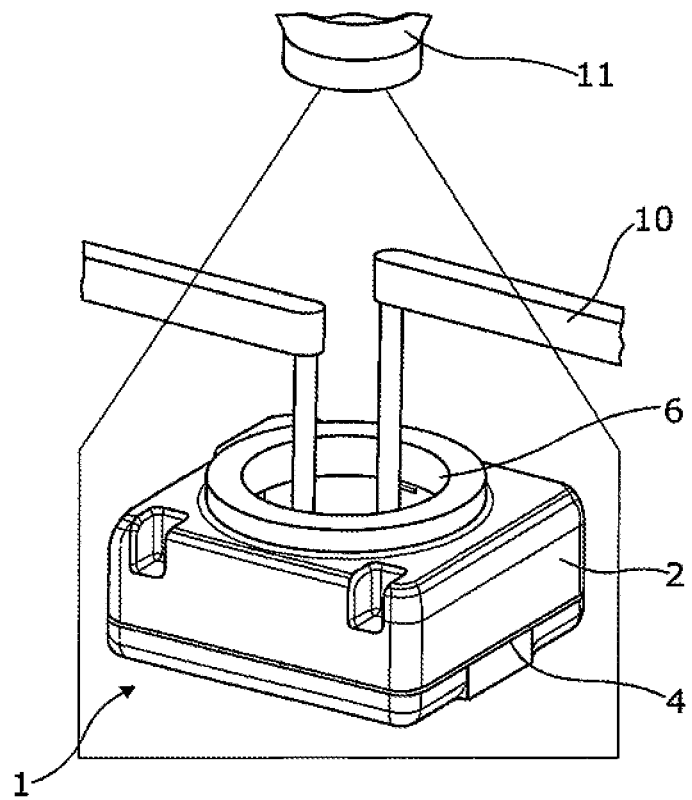
FIG. 4 shows an isometric view of the camera during the alignment step shown in FIG. 3.

FIGS. 3 and 4 show top and isometric views, respectively, of the camera shown in FIG. 1 during the alignment step of the assembly process. With the parts connected together, the assembly may be seated into a locator within a manufacturing apparatus (not shown). The locator locates the assembly below a projector 11, which is used to project an image through the opening 6 for simulating a focused image that would be produced by the lens, once fitted. The manufacturing apparatus further includes two manipulators 10 which insert through the opening 6 and are used to position the PCB 3 under the control of a controller (not shown).

In this connection, as shown best in the top view shown in FIG. 3, the imager 8 is mounted to the PCB 3 and includes an active region 81. The active region 81 corresponds to the part of the imager 8 used for detecting incident rays which are subsequently used to form the resultant image. As shown, during assembly, the projector 11 projects a simulated image 9 into the interior of the housing 2,4. The manipulators 10 are then used to adjust the position of the PCB 3 to align the active region 81 of the imager 8 with the location of the projected image 9. That is controller controls the manipulators 10 to shift and rotate the PCB in its seated position within the housing so that the active region 81 matches the projected image 9. Feedback for this control may be provided, for example, by detected feedback from the imager 8 itself or from an optical device facing the front of the assembly to monitor alignment with the projected image. The projected image may be, for instance, projected laser locators. In other embodiments, it will also be understood that the projector 11 may be replaced by a camera for visualising the location of the active region 81, with this being calibrated to be positionally accurate.

Once the manipulators 10 have positioned the PCB 1, the front and rear housing parts 2 and 4 may then be pressed together in order to clamp the PCB 3 in place between the clamping formations 5 and 7. The housing parts may then be fixed to secure the circuit board 3 in the aligned position. Fixing may be effected using a adhesives or a fastener such as a screw. For instance, a heat or UV curable adhesive may be provided between the mating regions of the housing parts to fix and stabilise their connection.

Figure 5:
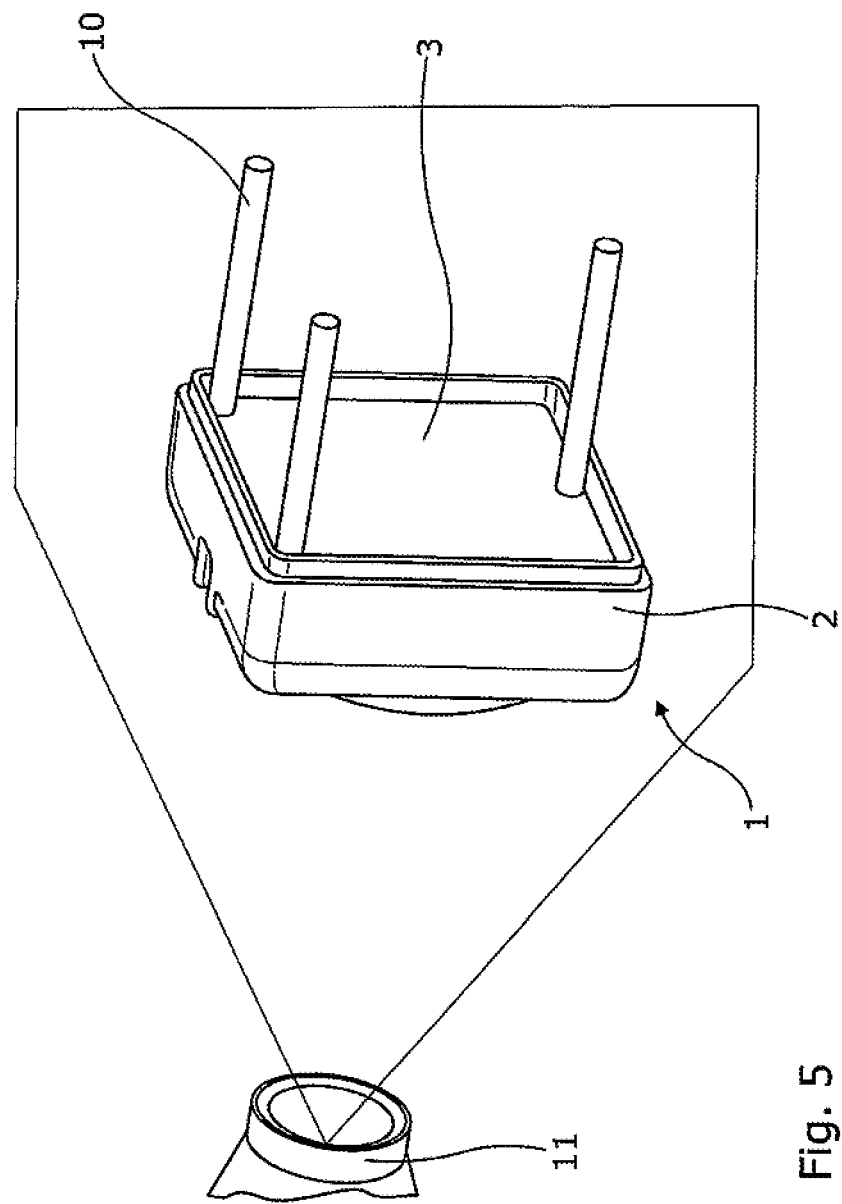
FIG. 5 shows an isometric view of a camera during an alignment step according to a further embodiment.

FIG. 5 shows an isometric view of a camera 1 during an alignment step according to a further embodiment. This embodiment is substantially the same as the embodiment above, except that manipulators 10 access the PCB 3 via the rear of the housing. That is, during assembly of the camera 1, the PCB 3 is placed against the clamping formations 5 provided on the front housing part 2. As such, the clamping formations 5 support the front surface of the PCB 3. With the rear housing part 4 unconnected, the manipulators 10 may then engage with the rear surface of the PCB 3. The manipulators 10 may thereby shift the position of the PCB 3 to align the active region 81 of the imager 8 to the position of the image that would be focused by the lens. Once in position, the rear housing part 4 may be connected to the front housing part 2 and fixed to secure the PCB 3.

Accordingly, with the above arrangements an improved optical device and method of assembly may be provided for producing cameras which have more accurately and consistently positioned imagers. At the same time, the use of the housing parts to clamp the PCB in place means that no additional fixings are required.

It will be understood that the embodiments illustrated above show examples only for the purposes of illustration. In practice, embodiments may be applied to many different configurations, the detailed embodiments being straightforward for those skilled in the art to implement.

The invention claimed is:

1. A method of assembling an optical device, the method comprising:
   providing a circuit board having an imager mounted thereto, wherein the imager has an active region;
   providing a housing having a support for supporting the circuit board and an opening for an optical path to form an image at a known image position relative to the opening;
   placing the circuit board on the support;
   adjusting the position of the circuit board on the support using one or more manipulators inserted through the opening to align the active region with the image position; and
   securing the circuit board in the aligned position.

2. The method of claim 1, wherein the step of adjusting the position of the circuit board includes rotating the circuit board on the support to align the active region with the image position.

3. The method of claim 1, wherein the step of providing the housing includes providing a lens holder part of the housing and a backing part of the housing for connection to the lens holder part.

4. The method of claim 3, further comprising the step of fitting the lens holder part and the backing part together once the circuit board has been placed on the support, and wherein the support is formed in the backing part.

5. The method of claim 3, wherein the step of securing the circuit board in an aligned position includes connecting the lens holder part to the backing part and fixing the connection therebetween.

6. The method of claim 5, wherein the housing further includes one or more clamping formations, wherein the step of securing the circuit board includes the one or more clamping formations clamping the circuit board against the support.

7. The method of claim 1, wherein the step of providing a housing includes providing the support with an engagement surface for engaging the circuit board, wherein the engagement surface includes at least one of a heatsink surface for conducting heat away from the circuit board and a grounding surface for grounding the circuit board.

8. The method of claim 1, further comprising the step of projecting a projected image onto the known image position using a projector and the step of adjusting the position of the circuit board includes aligning the active region with the projected image.

9. An optical device manufactured according to the method of claim 1.

10. A manufacturing apparatus for use during the method according to claim 1, the apparatus comprising one or more manipulators and a controller configured to control the one or more manipulators to align the active region with the image position.

* * * * *